(12) United States Patent
Cupelli

(10) Patent No.: US 11,715,113 B2
(45) Date of Patent: Aug. 1, 2023

(54) AFFORDABLE HOUSING INTERACTIVE WAITING LIST AND DATA SYNCHRONIZATION SYSTEM

(71) Applicant: AFFORDABLE HOUSING NETWORK, LLC, Boca Raton, FL (US)

(72) Inventor: Richard Cupelli, Boca Raton, FL (US)

(73) Assignee: AFFORDABLE HOUSING NETWORK, LLC, Boca Raton, FL (US)

( * ) Notice: Subject to any disclaimer, the term of this patent is extended or adjusted under 35 U.S.C. 154(b) by 114 days.

(21) Appl. No.: 17/240,563

(22) Filed: Apr. 26, 2021

(65) Prior Publication Data
US 2022/0343335 A1 Oct. 27, 2022

(51) Int. Cl.
G06Q 10/00 (2023.01)
G06Q 30/016 (2023.01)
G06Q 30/0201 (2023.01)
G06Q 30/0645 (2023.01)
G06N 20/00 (2019.01)
(Continued)

(52) U.S. Cl.
CPC ........... *G06Q 30/016* (2013.01); *G06F 16/23* (2019.01); *G06F 16/24578* (2019.01); *G06N 20/00* (2019.01); *G06Q 30/0201* (2013.01); *G06Q 30/0645* (2013.01); *G06Q 50/16* (2013.01)

(58) Field of Classification Search
None
See application file for complete search history.

(56) References Cited

U.S. PATENT DOCUMENTS

2003/0163347 A1  8/2003 Shaw et al.
2010/0198834 A1* 8/2010 Petras ............... G06F 16/34
                                                707/E17.014
(Continued)

FOREIGN PATENT DOCUMENTS

KR  2004/0048153 A   6/2004
WO  2008/101103 A2   8/2008
WO  2019/237572 A1  12/2019

OTHER PUBLICATIONS

Baldominos, Alejandro, Identifying Real Estate Opportunities Using Machine Learning, Nov. 21, 2018, MDPI, https://www.mdpi.com/2076-3417/8/11/2321, p. 1-41. (Year: 2018).*

(Continued)

*Primary Examiner* — Joseph M Waesco
(74) *Attorney, Agent, or Firm* — Squire Patton Boggs (US) LLP

(57) ABSTRACT

A method may include receiving data from the plurality of databases for an applicant to be placed on one or more waiting lists with one or more requirements. A user profile associated with the waiting list may be created based on the received data, and may be received from the applicant. An applicant ranking on the one or more waiting lists may be determined based on a match between the user profile and the one or more requirements. At least one of a need or a desire of the applicant may be monitored based on periodic activity of the applicant on the one or more waiting lists. Periodic changes to the one or more requirements may be monitored. The applicant ranking may be updated on the one or more waiting lists, and the updated one or more waiting lists may be synchronized with the plurality of databases.

15 Claims, 10 Drawing Sheets

(51) Int. Cl.
  *G06F 16/23* (2019.01)
  *G06F 16/2457* (2019.01)
  *G06Q 50/16* (2012.01)

(56) References Cited

U.S. PATENT DOCUMENTS

| | | | |
|---|---|---|---|
| 2012/0197685 A1 | 8/2012 | Mays et al. | |
| 2014/0201091 A1 | 7/2014 | Kimball et al. | |
| 2015/0088729 A1 | 3/2015 | Langere | |
| 2015/0199754 A1* | 7/2015 | Greystoke | G06Q 30/0645 705/307 |
| 2018/0075507 A1* | 3/2018 | Gormley | G07C 5/008 |
| 2018/0089912 A1* | 3/2018 | Penilla | G06Q 10/06314 |
| 2018/0253780 A1* | 9/2018 | Wang | H04L 51/02 |
| 2019/0114589 A1 | 4/2019 | Voss et al. | |
| 2019/0197180 A1* | 6/2019 | Jersin | H04L 51/214 |
| 2019/0197487 A1* | 6/2019 | Jersin | H04L 51/214 |
| 2020/0394199 A1* | 12/2020 | Haidar | G06F 16/9535 |
| 2020/0402013 A1* | 12/2020 | Yeung | G06Q 10/1053 |
| 2022/0293107 A1* | 9/2022 | Leaman | G06F 16/951 |
| 2022/0314074 A1* | 10/2022 | Bissonnette | A63B 24/0062 |

OTHER PUBLICATIONS

Malden Housing Authority, https://affordablehousingonline.com/; www.maldenhousing.org/Applicants.php, retrieved from the internet on Oct. 6, 2020, 3 pages.
Michael Lazdowsky, "Waitlist reimagined: Rethink your waitlist management style", NMA blog, Nan McKay and Associates, Inc., blog.nanmckay.com/waitlist, retrieved from the internet Oct. 6, 2020, 8 pages.
MassAccess The Accessible Housing Registry, Understanding Waiting Lists, Mass Access Housing Registry, https://www.massaccesshousingregistry.org/resources/understanding-waiting-lists, retrieved from the internet on Oct. 6, 2020, 3 pages.
MRI, Blog, May 24, 2013, The Wonderful Waitlist?—MRI Software, https://www.mrisoftware.com/blog/the-wonderful-waitlist/, 5 pages, retrieved from the internet on Oct. 6, 2020.

* cited by examiner

FIG. 9

AFFORDABLE HOUSING INTERACTIVE WAITING LIST AND DATA SYNCHRONIZATION SYSTEM

FIELD

Some embodiments may generally relate to property listing services. More specifically, certain embodiments may relate to apparatus, systems, and/or methods for an affordable housing bridge waiting list and data synchronization system that may be applicable in a listing service for real estate properties.

BACKGROUND

There are numerous affordable housing programs available to the public, and each program may have a variety of unique waiting lists, broken down by specific rules, demographic information, and other qualifying factors. These waiting lists may allow agencies to prioritize applicants based on specific criteria. For example, one agency may serve veterans before other types of applicants, while another agency might prioritize applicants based on local residency.

Currently, renters may go online and search for housing, and Internet listing services post listings. Although renters may post something as it becomes available, "availability" is often determined by the owner posting the listing and maintained by the owner posting the listing. Further, private landlords may post something and forget about it. As such, it may be difficult to truly know whether a unit is available. As a result, a person interested in the unit would need to contact the owner to determine if it is really available.

Many of the current larger listing companies have feeds. The feeds relate to availability, which may be updated by management software. It may also require owners to add unit listings and change the status of the listings daily. For affordable housing, it may be similar but different. For example, it may often be in great demand but low supply. When affordable housing is posted online, it may be rented very quickly. Moreover, if the affordable housing is some sort of assisted program, to qualify, one may have to earn a certain income or less. These types of listings are often in high demand that there is almost always a waiting list. Thus, for affordable housing, one may have to find out when the waiting list is open. Unfortunately, however, they are often not open, and this is usually because they are hard to maintain. For example, sometimes managers may close the waiting list because they have enough applicants on the list. Further, sometimes waiting lists may be closed/unavailable for years. In addition, the administrative burden to keep a waiting list accurate and current can be significant.

Additionally, in many cases, individuals and families may qualify for multiple types of assistance through several state and federal agencies—but in order to get on a waiting list, they may be required to apply to each agency separately. In other words, if a family qualifies for 20 different programs, they may need to fill out 20 applications. Unfortunately, none of the data is shared between agencies. The affordable housing waiting lists may have different eligibility criteria based on program, and based on location. In addition, there may be different types of conditions that can make waiting list management cumbersome.

In view of the above, there is a need for a universal waiting list that can use an automated intelligent system to help ensure that families' application information is kept up-to-date. This may reduce the likelihood of a family being removed from a waiting list due to outdated information, and ensure an applicant does not miss an offer. There is also a need to resolve the current issues by streamlining the listing procedures and eliminating the need for multiple applications.

SUMMARY

Certain embodiments may be directed to a method for providing one or more waiting list solutions compatible with a plurality of databases. The method may include receiving data from the plurality of databases for an applicant to be placed on the one or more waiting lists with one or more requirements. The method may also include creating a user profile associated with the one or more waiting lists based on the received data. The method may further include receiving updates to the user profile from the applicant. In addition, the method may include determining an applicant ranking on the one or more waiting lists based on a match between the user profile and the one or more requirements. Further, the method may include monitoring at least one of a need or a desire of the applicant based on periodic activity of the applicant on the one or more waiting lists. The method may also include monitoring periodic changes to the one or more requirements. The method may further include updating the applicant ranking on the one or more waiting lists based on the monitored at least one of the need, the desire, or the activity of the applicant and the changes to the one or more requirements. In addition, the method may include synchronizing the updated one or more waiting lists with the plurality of databases.

Other embodiments may be directed to a method for maintaining one or more waiting lists. The method may include receiving data for an applicant to be placed on the one or more waiting lists with one or more requirements. The method may also include creating a user profile associated with the one or more waiting lists based on the received data. The method may further include determining an applicant ranking on the one or more waiting lists based on a match between the user profile and the one or more requirements. In addition, the method may include monitoring at least one of a need or a desire of the applicant based on periodic activity of the applicant on the one or more waiting lists. Further, the method may include monitoring periodic changes to the one or more requirements. The method may also include updating the applicant ranking on the one or more waiting lists based on the monitored at least one of the need, the desire, or the activity of the applicant and the changes to the one or more requirements.

Other embodiments may be directed to a method for maintaining one or more waiting lists. The method may include receiving data for an applicant to be placed on the one or more waiting lists with one or more requirements. The method may also include creating a user profile associated with the one or more waiting lists based on the received data. The method may further include determining an applicant ranking on the one or more waiting lists based on a match between the user profile and the one or more requirements. In addition, the method may include monitoring at least one of a need or a desire of the applicant based on periodic activity of the applicant on the one or more waiting lists. Further, the method may include monitoring periodic changes to the one or more requirements. The method may also include processing the at least one of the need, the desire, or the activity of the applicant, and the periodic changes to the one or more requirements using a machine learning model. The method may further include dynamically updating, using the machine learning model, the applicant ranking on the one or more waiting lists according to a result of the processing.

Other embodiments may be directed to an apparatus. The apparatus may include at least one processor, and at least one memory including computer program code. The at least one memory and the computer program code may be configured to, with the at least one processor, cause the apparatus at least to receive data from the plurality of databases for an applicant to be placed on one or more waiting lists with one or more requirements. The apparatus may also be caused to create a user profile associated with the one or more waiting lists based on the received data. The apparatus may further be caused to receive updates to the user profile from the applicant. In addition, the apparatus may be caused to determine an applicant ranking on the one or more waiting lists based on a match between the user profile and the one or more requirements. Further, the apparatus may be caused to monitor at least one of a need or a desire of the applicant based on periodic activity of the applicant on the one or more waiting lists. The apparatus may also be caused to monitor periodic changes to the one or more requirements. The apparatus may further be caused to update the applicant ranking on the one or more waiting lists based on the monitored at least one of the need, the desire, or the activity of the applicant and the changes to the one or more requirements. In addition, the apparatus may be caused to synchronize the updated one or more waiting lists with the plurality of databases.

Other embodiments may be directed to an apparatus, which may include at least one processor, and at least one memory including computer program code. The at least one memory and the computer program code may be configured to, with the at least one processor, cause the apparatus at least to receive data for an applicant to be placed on one or more waiting lists with one or more requirements. The apparatus may also be caused to create a user profile associated with the one or more waiting lists based on the received data. The apparatus may further be caused to determine an applicant ranking on the one or more waiting lists based on a match between the user profile and the one or more requirements. In addition, the apparatus may be caused to monitor at least one of a need or a desire of the applicant based on periodic activity of the applicant on the one or more waiting lists. Further, the apparatus may be caused to monitor periodic changes to the one or more requirements. The apparatus may also be caused to process the at least one of the need, the desire, or the activity of the applicant, and the periodic changes to the one or more requirements using a machine learning model. The apparatus may further be caused to dynamically update, using the machine learning model, the applicant ranking on the one or more waiting lists according to a result of the processing.

Other embodiments may be directed to a computer program, embodied on a non-transitory computer readable medium. The computer program, when executed by a processor, may cause the processor to receive data from the plurality of databases for an applicant to be placed on one or more waiting lists with one or more requirements. The processor may also be caused to create a user profile associated with the one or more waiting lists based on the received data. The processor may further be caused to receive updates to the user profile from the applicant. In addition, the processor may be caused to determine an applicant ranking on the one or more waiting lists based on a match between the user profile and the one or more requirements. Further, the processor may be caused to monitor at least one of a need or a desire of the applicant based on periodic activity of the applicant on the one or more waiting lists. The processor may also be caused to monitor periodic changes to the one or more requirements. The processor may further be caused to update the applicant ranking on the one or more waiting lists based on the monitored at least one of the need, the desire, or the activity of the applicant and the changes to the one or more requirements. In addition, the processor may be caused to synchronize the updated one or more waiting lists with the plurality of databases.

Other embodiments may be directed to a computer program, embodied on a non-transitory computer readable medium. The computer program, when executed by a processor, causes the processor to receive data for an applicant to be placed on one or more waiting lists with one or more requirements. The processor may also be caused to create a user profile associated with the one or more waiting lists based on the received data. The processor may further be caused to determine an applicant ranking on the one or more waiting lists based on a match between the user profile and the one or more requirements. In addition, the processor may be caused to monitor at least one of a need or a desire of the applicant based on periodic activity of the applicant on the one or more waiting lists. Further, the processor may be caused to monitor periodic changes to the one or more requirements. The processor may also be caused to process the at least one of the need, the desire, or the activity of the applicant, and the periodic changes to the one or more requirements using a machine learning model. The processor may further be caused to dynamically update, using the machine learning model, the applicant ranking on the one or more waiting lists according to a result of the processing.

BRIEF DESCRIPTION OF THE DRAWINGS

For proper understanding of example embodiments, reference should be made to the accompanying drawings, wherein:

FIG. 9 illustrates a user's status on multiple waiting lists, according to certain example embodiments.

DETAILED DESCRIPTION

Figure 1:
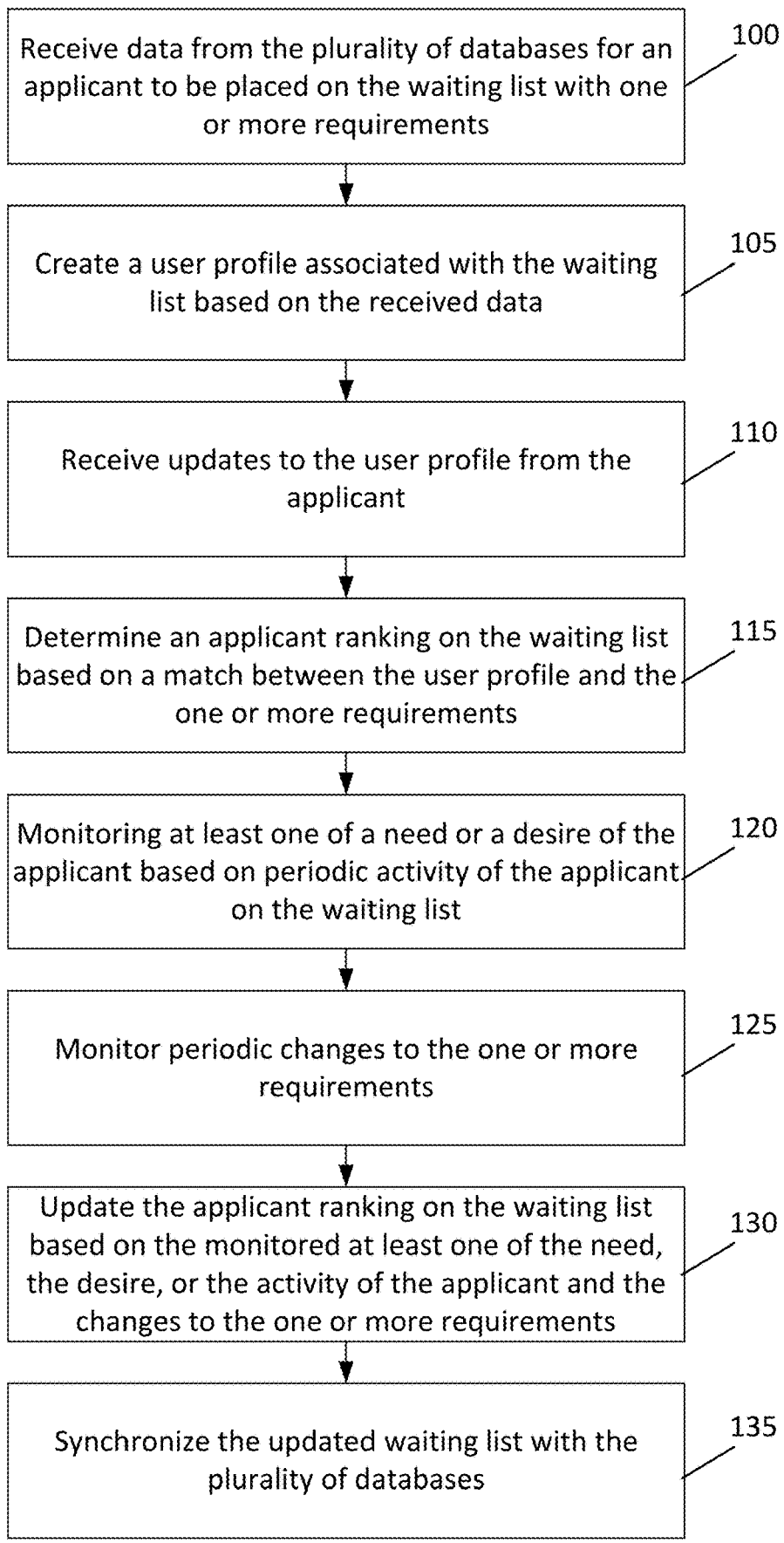
FIG. 1 illustrates a flow diagram of a method, according to certain example embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for an affordable housing bridge waiting list and data synchronization system that may be applicable in a listing service for real estate properties.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain embodiments may provide a universal waiting list software that uses an automated reminder system to help ensure that families' application information are kept up-to-date across multiple affordable housing databases. This may reduce the likelihood of a family being removed from a waiting list due to outdated information, and ensure that an applicant does not miss an offer. According to certain embodiments, updated requirements and deadlines may vary from list to list. A shared application pool algorithm of certain embodiments may manage disparate update requirements ensuring one update on the shared common application is applied to all lists per each requirement. This may be beneficial, as families would not need to remember and manage various waiting list requirement deadlines. In addition, the updated clock may reset for each list differently and automatically.

According to certain embodiments, an applicant may submit one single, computerized common application for multiple housing waiting lists. For example, this may include a single application form that is used by more than one public housing authority (PHA). Further, in certain embodiments, a shared applicant pool may be a group of PHAs that maintain a common database of all applicants to one or more of their programs.

Figure 8:
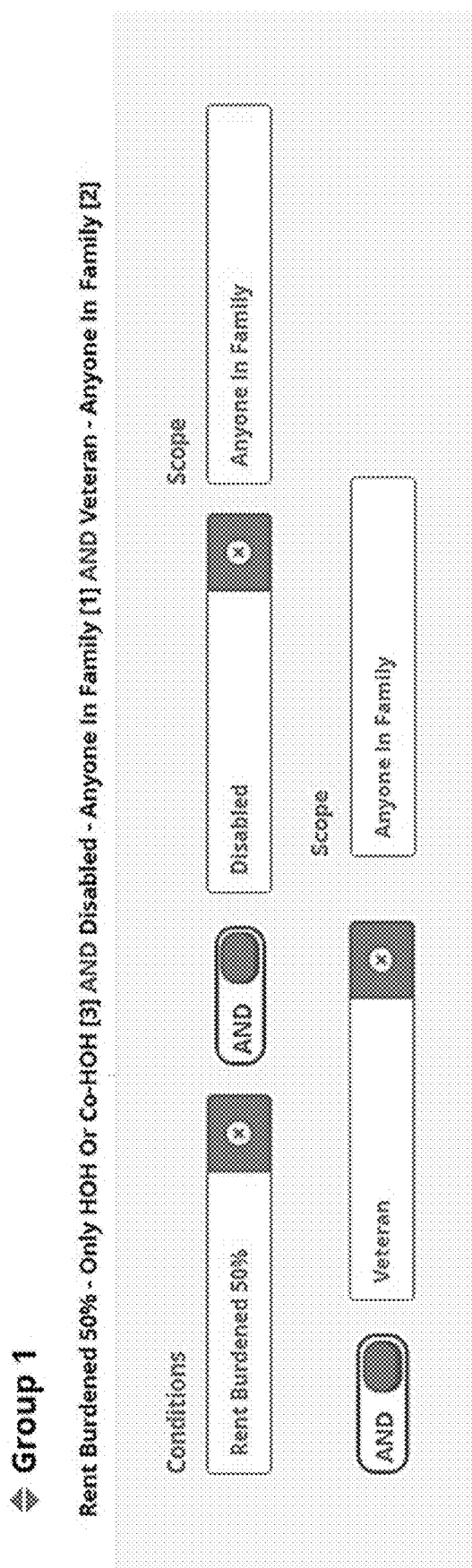
FIG. 8 illustrates an exemplary configuration of the rules engine, according to certain embodiments.
Figure 10:
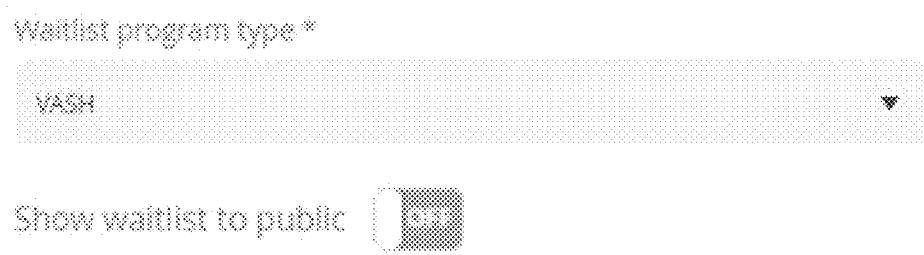
FIG. 10 illustrates configuration of a waiting list to make it available to the public, according to certain example embodiments.

In certain embodiments, applicants may receive alerts for availabilities. However, in other embodiments, once the applicants are in the system, it may be possible to automatically apply them to new opportunities when the new opportunities become available. Because affordable housing agencies may create and customize waiting lists to help them prioritize their waiting lists, certain embodiments may provide a waiting list wizard function that allows agencies to create unique sets of rules and conditions based on the guidelines set by their local policy. For example, in certain embodiments, the waiting list wizard may be a rules engine (as shown in FIG. 8) that allows any condition/preference to be prioritized (weighted and/or ranked) within geographic boundaries, and for specific or indeterminate periods of time. The waiting list wizard may also include inclusion and exclusion logic. Agencies may also share client applications and waiting lists while still being able to maintain their own unique waiting list configurations. This functionality may allow agencies to update or create new waiting lists in response to sudden or immediate needs such as providing housing or resources after a natural disaster.

According to certain embodiments, sub-schedules (e.g., finite waiting list opening and closing times) may be associated with a specific disaster preference so that temporary preferences may be given to victims of a disaster for a specific window of time. According to other embodiments, the availability and status of the client may be determined by the owner posting the listing, and maintained by the owner posting the listing. For instance, in certain embodiments, a small business may have multiple properties. In such a scenario, it may be possible to post something and forget about it. Other embodiments may provide capabilities of providing a new status for online housing listings that anticipates unit availability based on user behavior and supply and demand. Sometimes, what is available online may not be known, and it may require a person to reenter to contact the owner. In addition, the property owners may need to change the status over certain properties themselves on a daily basis.

In some cases, to qualify for a certain listing, an interested party may need to qualify for that specific property. For example, the interested party may need to earn a certain income. In these types of scenarios, the interested party may find out if waiting lists are open. Sometimes the waiting lists are open, and sometimes they are not open because it may be a burden to maintain, and none of this data may be shared among affordable housing agencies. Although some affordable housing waiting lists may have different eligibility requirements based on program and location, certain embodiments may merge the two to create a waiting list solution that works for various types of housing. As such, certain embodiments may bring waiting lists to the private sector.

For example, in certain embodiments, when a unit is posted online, if no units are available, it may be possible to show it as being not available. As such, certain embodiments may provide the ability to place people into a waiting list should the unit become available. In other embodiments, the waiting list may be prioritized by taking into account certain conditions, and people may not have to wait for a unit to become available. Instead, property owners may be able to have a steady reservoir of applicants ready to rent or purchase a unit.

Further embodiments may provide a steady flow of applicants with validated data. For example, according to certain embodiments, information put into the system may be continuously verified and updated. According to certain embodiments, user activity data (e.g., frequency trends and type) type may include contact information such as, for example, phone numbers, cellular numbers, emails, and physical mailing addresses. In certain embodiments, the waiting list may be self-updating constantly in real-time, and the applicant data may be continuously validated in real-time based on changes to at least one of the applicant's need, desire, or activity (as shown in FIG. 9). Further, when there is a pool of applicants, the applicants may update their information on one list, and in doing so, their information may be updated on all waiting lists where they are registered.

According to certain embodiments, applicants may be ranked on the waiting list. For example, the waiting list may be sorted by activity including, for example, whether they are responsive, still interested, their income, and other types of activities. In certain embodiments, the ranking algorithm may take into account people who update their profiles more consistently. For example, in certain embodiments, the activity may be tracked in real-time, and frequency of the activity may be a factor in the activity algorithm. In some embodiments, the activity may or may not change the ranking, and may depend on whether the activity is defined as a factor in the ranking preferences. In addition, in some embodiments, inactivity may be measured as part of the algorithm. Further, in certain embodiments, the waiting list may be a collaborative waiting list, and the ranking may take into consideration other lists where the applicant may be listed. In other embodiments, the applicant ranking may be determined based on a match between the applicant user profile and one or more requirements. According to certain embodiments, the user profile may be synchronously updated and maintained for all of the databases/programs based on changes made to the user profile by the applicant.

Certain embodiments may allow property owners to set certain conditions (e.g., credit score, rental history, etc.), and applicants who apply to be on the waiting list may be placed on the waiting list if one or more of the set conditions are satisfied. In certain embodiments, the waiting list may be an application. An applicant may apply to wait, and may have to qualify in order to be eligible to be placed on the waiting list. As such, this may be a two-step process. For instance, an applicant may apply to wait. Then, after the applicant is selected, there may be an eligibility or qualifying step. The algorithm according to certain embodiments may effectively determine the best match per the specific housing program requirements. The best match may then go to the top of the list(s). Once the best match is determined, a full application (to determine eligibility) may be sent. According to certain embodiments, this two-step process may eliminate the time wasted filtering through applications that do not meet the program requirements.

According to certain embodiments, it may be possible to configure the application to remove an applicant or family based on what is happening to other communities. For example, a property manager may see what waiting lists an applicant is on, and the property manager may determine whether the applicant was selected by another property manager. If so, the application status of the applicant may be changed, and the property manager may configure the system such that the property manager may automatically remove an applicant.

Figures 5, 6:
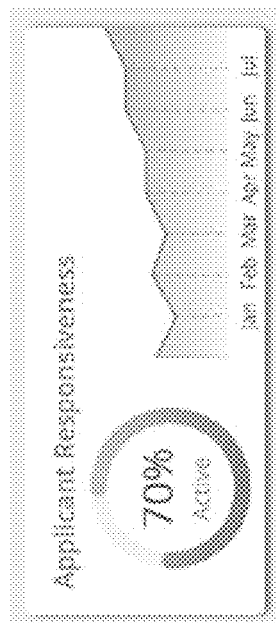
FIG. 5 illustrates a measurement of user interest and activity level based on the user's activity on a waiting list, according to certain example embodiments.
FIG. 6 illustrates the use of a single shared user application for multiple agencies, landlords or programs, according to certain example embodiments.
Figure 7:
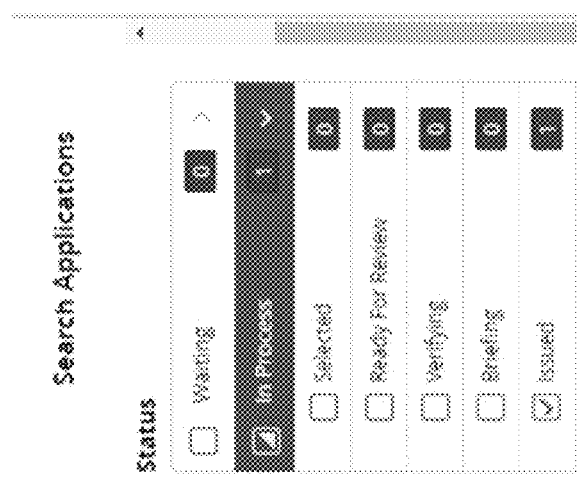
FIG. 7 illustrates the administrative capabilities of the system, according to certain example embodiments.

Certain embodiments may provide the ability to dynamically change the waiting list status (see FIG. 6) based on unforeseen circumstances (e.g., things that may affect the applicant including, for example, changes in income, employment, need, desire, etc.). For example, waiting lists that are inactive or closed may be immediately re-activated (opened) to accommodate emergency situations. Although a list may be "closed", applicants on the list may still be updated using the activity algorithm because of the shared waiting list methodology. As such, according to certain embodiments, even closed lists may be updated and current. Furthermore, certain embodiments may change the ranking or status of an applicant on the waiting list due to the occurrence of natural disasters. In addition, the waiting list may be reorganized for a specific period of time, and the waiting list may include sub-lists, sub-categories, and sub-preferences that open and close for different reasons. For example, in certain embodiments, an agency may have a waiting list for one program (e.g., section 8) with many applicants. The agency may choose to use this already established list for new programs by creating new lists with a subset of applicants that meet the criteria for the new special program for a specific period of time (e.g., temporary funding for homeless veterans). As such, an agency may not need to set up a new program specific list from scratch and wait for the proper applicants to apply. Instead, the agency can repurpose the already existing lists.

Some embodiments may provide a shared waiting list. With a shared waiting list, each participating housing agency may maintain their own policies, and may share collective functionality. For example, certain shared collective functionalities may include updating and maintaining one common application for all housing programs at each participating housing agency. The shared collective functionality may also include automatically withdrawing applications that have been issued a voucher or housed at another participating housing agency. The shared collective functionality may further include the ability to synchronize existing applications to ensure data consistency, and to avoid duplication errors. A further shared collective functionality may include sharing application history, status, and all applicant activity on the system. For example, the applicant activity may include a communication and behavior activity log. The log may include email and text messages opened, read, replied to, ignored, etc., and how responsive the applicant is to these communications. Application activity may also include changes to fields in an application. In addition, status change activity may relate to the applicant's ranking based on specific waiting list criteria, and how active the applicant is. Further, search activity may determine if the applicant needs/wants have changed from when the applicant originally applied to a waiting list.

Certain embodiments may provide and maintain a courtesy custom renter portal and housing locator for a website. According to certain embodiments, the housing locator may be customized to fit the theme of an agency's website, which may provide easy access to families searching for housing in an area, and for property owners to list and manage their properties. Moreover, the housing locator may display verified listing details in real-time.

Some embodiments may provide an API that may be compatible with commercially available browsers. Further, some embodiments may provide the ability to process paper applications to accommodate individuals who are unable to access an electronic form and as a reasonable accommodation. Certain embodiments may also optimize screen processes for frequent and repetitive data entry tasks, and provide the ability to import and export data in a variety of standard formats, including fixed width, comma quote delimited, spreadsheets, and portable document format (PDF). Further, certain embodiments may provide extranet accessibility for approved PHAs/parties (e.g., referral waiting lists including, for example, veteran's affairs supportive housing (VASH) and family unification program (FUP)). In addition, some embodiments may comply with housing and urban development (HUD) recommended technical and functional considerations. Certain embodiments may also provide accessibility to individuals with disabilities, the elderly population, and limited English proficiency (LEP) populations. Moreover, certain embodiments may provide an audit trail for every field that was added, changed, or deleted (and sometimes viewed), and track the details of an individual applicant, a type of applicant or program, a PHA, or the entire system.

According to certain embodiments, it may be possible to provide an application programming interface (API) for the Affordable Housing waiting list and data synchronization system that is capable of adapting to any program and PHA policy, that is capable of sorting a list by date/time or lottery, and any PHA preferences, and that is capable of providing PHA custom reports. According to other embodiments, the housing bridge API may provide a one-step or two-step application process, clear the audit trail of selection of applicants and changes made to applications, provide unlimited waitlist openings, target funding and/or emergency applications, provide special admission override features (e.g., user permissions may dictate what required fields to protect personal identifiable information), provide robust security of personal information, and provide the ability to redact reports, hide personal information (e.g., social security numbers (SSN)), and provide data encryption. In other embodiments, the housing bridge API may provide the ability to synchronize a waiting list for a shared application for multiple programs and/or databases. The programs may include, for example, public housing, rate housing, section 8, any rental property, and others. Thus, according to certain embodiments, the housing bridge API may serve as a universal application in view of the synchronization capability with multiple programs.

According to certain embodiments, an applicant may apply for a specific program(s) and locations (for the project-based voucher (0) program), as well as perform other tasks related to the application including, for example, updating information and checking on status. Other embodiments may enable applicants to amend their application with updated information that correspond to local preferences such as, for example, homelessness, veteran, disability status, and others. In addition, some embodiments may allow or restrict, by user or group on multiple levels (e.g., system administrator, local administrator, PHA administrator, applicants, and reviewers the ability to access or update data). Further embodiments may provide the ability to query detailed data and totals for use in reports, maintain historical data of every field changed in the system, and back up data using common disaster recovery strategies. Certain example embodiments may display results of searches in custom search reports. Some embodiments may also provide the ability of the PHA to add individuals or applicants to the pool themselves, such as when a PBV participant moves from their unit and needs to be added to a PHA's housing choice voucher (HCV) waitlist. In addition, certain embodiments may provide an extranet function that allows approved PHA staff to obtain and enter applications.

In certain embodiments, applicant and household information may be collected to conduct eligibility verification, assist in verifying eligibility and preferences, and calculate personal finance information. For instance, the personal finance information may include annual income, adjusted annual income, tenant portion of the rent, and housing assistance payment of the rent. According to other embodiments, applicants may fill out one application to apply to multiple waiting lists, and the waiting list applicant data may be shared with other agencies and programs. In addition, audit logs may be created to ensure compliance with complete transparency, and application information (e.g., applicant income and household information, and any personal identifiable information used to determine eligibility) may be use to create an applicant profile (user profile), which is continuously verified in real-time and kept current (e.g., mailing address, emails, phone numbers, application information, etc.). Further, certain embodiments may track applicant activity and communications from emails, texts, phone calls, application changes, and application histories, and other embodiments may create a daily official record (e.g., automatically save a copy of every waiting list every day) and a HUD compliant audit report.

Certain embodiments may utilize a computer with a user interface that executes software algorithm(s). According to certain embodiments, the algorithm may understand a tenant's desires, needs and/or activity, and a landlord of a property may be able to match a property based on the tenant's desires, needs, and/or activity. As such, certain embodiments may blend desires (what someone wants), needs (e.g., minimum acceptable requirements) and activity, and understand what a potential buyer of a property wants, and what they could really afford. According to other embodiments, the algorithm may determine a buyer's desires by examining a buyer's behavior on a website. Through such behavior, the algorithm may know the types of properties viewed by the buyer, and the price ranges of those properties. In addition, the algorithm may learn, based on the buyer's behavior, to gain a better understanding of what the buyer is willing to accept, and determine what the buyer wants and is willing to accept. For example, in certain embodiments, the algorithm may learn the need, the desire, and the activity of the applicant by tracking the applicant's activity and the applicant's communications. According to other embodiments, the algorithm may determine the activity of the buyer by determining whether the buyer is actively searching (searches logged in real-time) for a property. With information regarding the buyer's activity, needs, and/or desires, certain embodiments may be able to dynamically update the waiting list, which may be shared between multiple housing programs.

In some embodiments, the algorithm may determine the buyer's motivation based on a recurrence of the buyer's search. For example, in making this determination, the algorithm may consider a frequency of the buyer's search, an area that the buyer is searching, and the specific property and/or specific property type(s) that the buyer is searching. According to other embodiments, the algorithm may determine an activity of the buyer based on various types of communication including, for example, the buyer's replies to emails, replies to updates, or whether the buyer is ignoring communications. According to further embodiments, the algorithm may determine what the buyer qualifies for, and what the buyer is eligible for. With the above information, the algorithm may generate a unique scenario to take the applicant/buyer, and apply them to an opportunity the moment that the opportunity occurs. In certain embodiments, the algorithm may perform this application to an opportunity without any action by the applicant/buyer.

According to certain embodiments, the algorithm may be integrated with existing housing software. For example, according to certain embodiments, the algorithm may provide an API to enhance customer data in third-party systems, including existing or legacy PHA software systems. Further, the algorithm according to certain embodiments may handle different programs including, for example, disasters and referral programs. In certain embodiments, algorithm may be implemented with various agency and vendor software to rank applicants for any program, and then import them with rankings in place. For instance, in certain embodiments, the algorithm may be implemented such that one or more offers from third party vendors may be received for performing services to a real estate rental property or other real estate transaction based on a change in status of the real estate rental property or the other real estate transaction. According to certain embodiments, the implementation would not require coding for unique enhancements (e.g., conditions) for special programs and circumstances.

In certain embodiments, the integrated algorithm may provide the ability to export various types of data. For instance, in some embodiments, the data may include activity log data, applicant activity level (e.g., inactive, active, etc.), updated contact information and verification in real-time, or links to tenant profile that allow for the PHA to open a browser and communicate directly via email and short message service (SMS). According to other embodiments, the integrated algorithm may provide the ability to see t other waiting lists where the applicant may be registered (see FIG. 9).

FIG. 1 illustrates a flow diagram of a method, according to certain embodiments. In certain embodiments, the flow diagram of FIG. 1 may be performed by a computer, computer system, or server, for instance, similar to apparatuses 10 or 20 illustrated in FIG. 4(a) or 4(b).

According to certain embodiments, the method of FIG. 1 may be for providing a waiting list solution compatible with a plurality of databases. As illustrated in FIG. 1, the method may include, at 100, receiving data from the plurality of databases for an applicant to be placed on the waiting list with one or more requirements. The method may also include, at 105, creating a user profile associated with the waiting list based on the received data. The method may further include, at 110, receiving updates to the user profile from the applicant. In addition, at 115, the method may include determining an applicant ranking on the waiting list based on a match between the user profile and the one or more requirements. Further, at 120, the method may include monitoring at least one of a need or a desire of the applicant based on periodic activity of the applicant on the waiting list. At 125, the method may include monitoring periodic changes to the one or more requirements. The method may also include, at 130, updating the applicant ranking on the waiting list based on the monitored at least one of the need, the desire, or the activity of the applicant and the changes to the one or more requirements. Further, at 135, the method may include synchronizing the updated waiting list with the plurality of databases.

According to certain embodiments, the method may also include dynamically changing a status of the applicant on the waiting list based on unforeseen circumstances. According to other embodiments, the waiting list may include sub-lists, sub-categories, and sub-preferences that are configured to open and close. According to further embodiments, the method may include synchronously updating and maintaining the user profile for all of the plurality of databases based on changes made to the user profile by the applicant. In certain embodiments, the user profile may be applicable to a plurality of waiting lists. In some embodiments, the method may further include learning the need, the desire, and the activity of the applicant by tracking applicant activity and applicant communications. In other embodiments, the received data may include applicant data, and the method may also include continuously validated in real-time the applicant data based on changes to at least one of the applicant's need, desire, or activity.

According to certain embodiments, the method may further include automatically applying the applicant to an opportunity when the opportunity is available. According to other embodiments, the method may include sorting the waiting list according to an activity of the applicant. In certain embodiments, the waiting list may be related to a real estate rental property or other real estate transaction. In other embodiments, the method may include receiving one or more offers from third party vendors for performing services to the real estate rental property or the other real estate transaction based on a change in status of the real estate rental property or the other real estate transaction.

Figure 2:
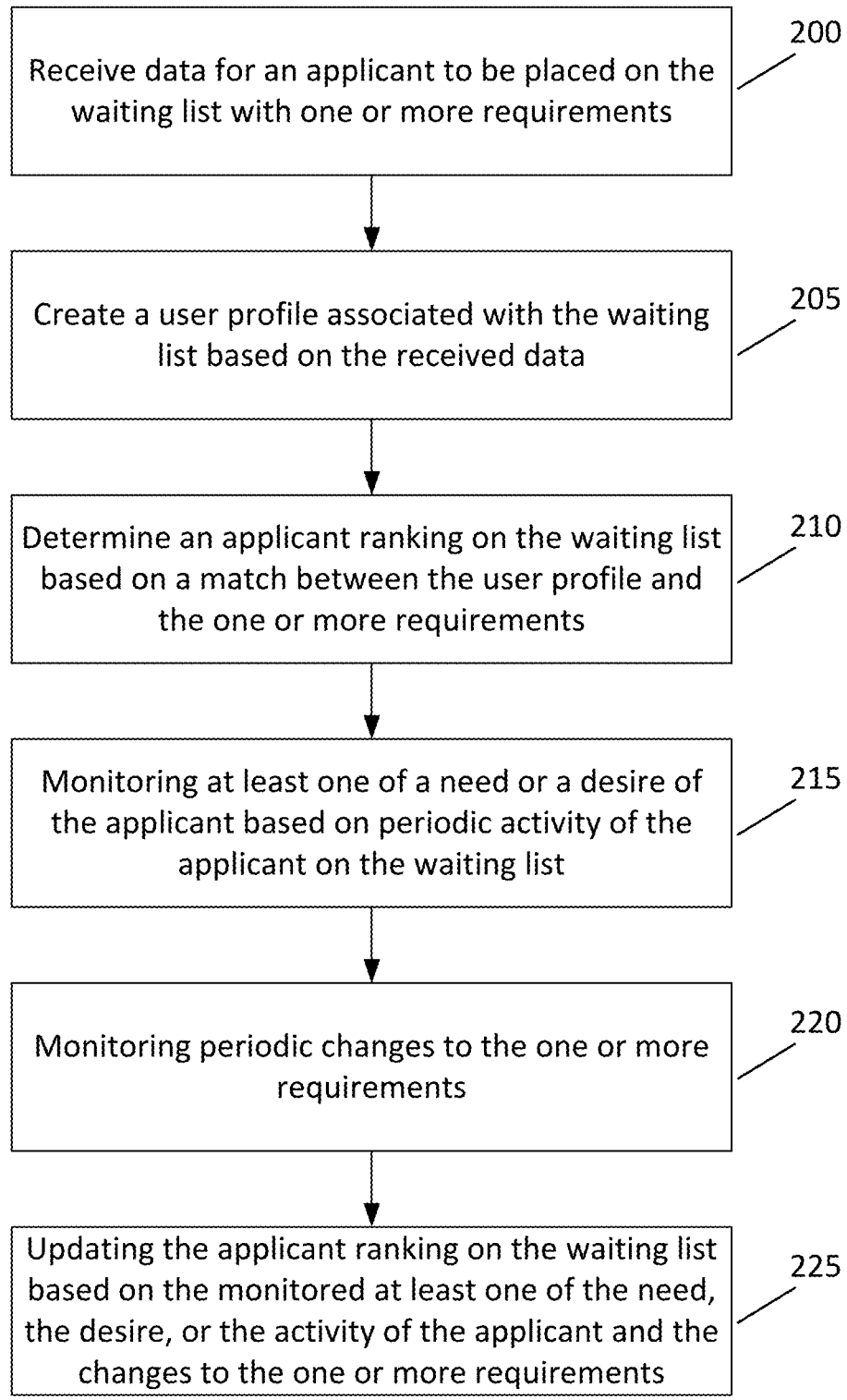
FIG. 2 illustrates a flow diagram of another method, according to certain example embodiments.

FIG. 2 illustrates a flow diagram of another method, according to certain embodiments. According to certain embodiments, the method of FIG. 2 may be performed by another computer, computer system, or server, for instance, similar to apparatuses 10 or 20 illustrated in FIG. 4(a) or 4(b).

According to certain embodiments, the method may be for maintaining a waiting list. In particular, the method may include, at 200, receiving data for an applicant to be placed on the waiting list with one or more requirements. The method may also include, at 205, creating a user profile associated with the waiting list based on the received data. The method may further include, at 210, determining an applicant ranking on the waiting list based on a match between the user profile and the one or more requirements. In addition, the method may include, at 215, monitoring at least one of a need or a desire of the applicant based on periodic activity of the applicant on the waiting list. Further, at 220, the method may include monitoring periodic changes to the one or more requirements. At 225, the method may include updating the applicant ranking on the waiting list based on the monitored at least one of the need, the desire, or the activity of the applicant and the changes to the one or more requirements.

According to certain embodiments, the method may further include dynamically changing a status of the applicant on the waiting list based on unforeseen circumstances. According to other embodiments, the waiting list may include sub-lists, sub-categories, and sub-preferences that are configured to open and close. According to further embodiments, the user profile may be applicable to a plurality of waiting lists. In certain embodiments, the method may also include learning the need, the desire, and the activity of the applicant by tracking applicant activity and applicant communications. In other embodiments, the received data may include applicant data, and the method may further include continuously validated in real-time the applicant data based on changes to at least one of the applicant's need, desire, or activity. In some embodiments, the method may also include sorting the waiting list according to an activity of the applicant.

Figure 3:
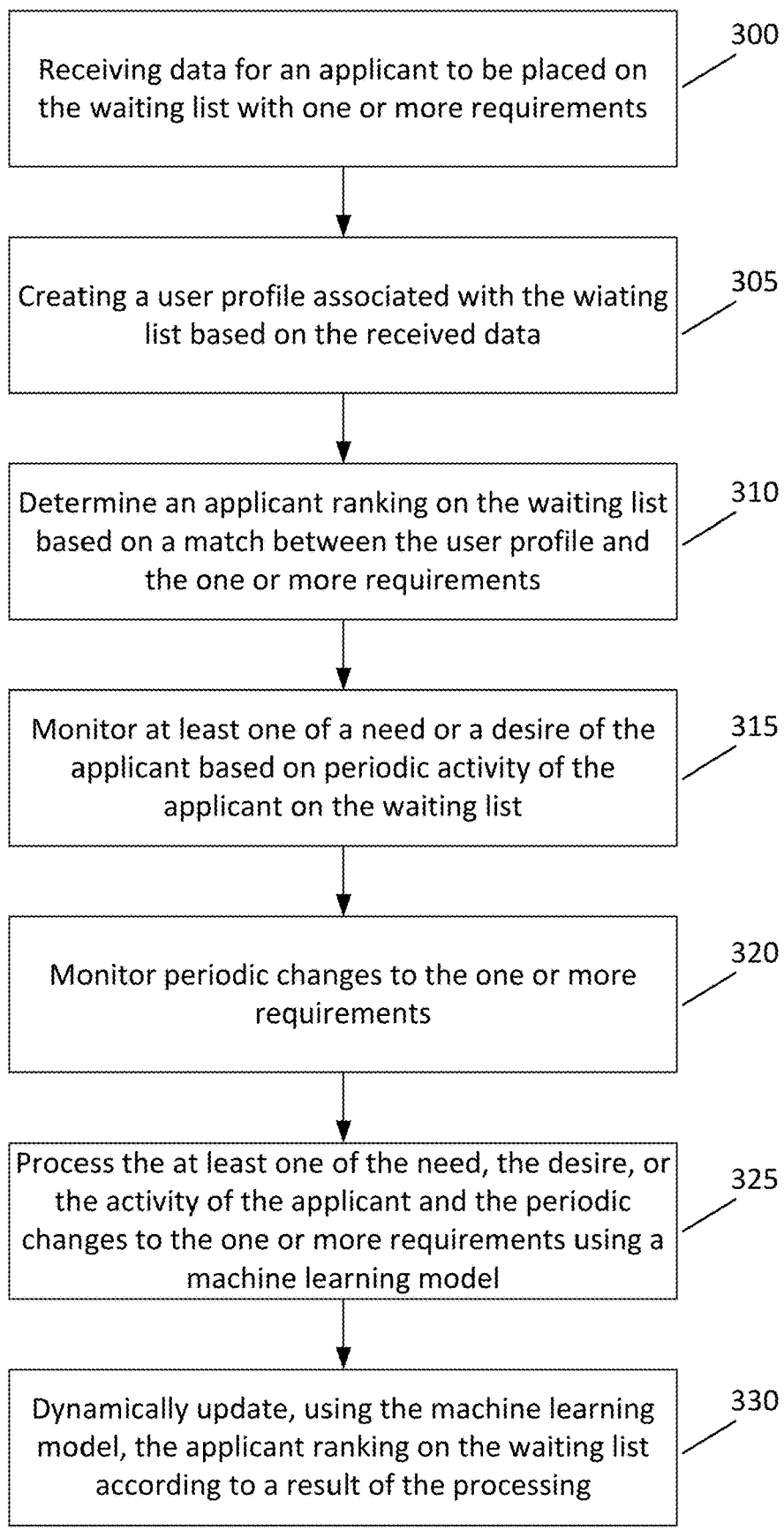
FIG. 3 illustrates a flow diagram of a further method, according to certain example embodiments.

FIG. 3 illustrates a flow diagram of a further method, according to certain embodiments. According to certain embodiments, the method of FIG. 2 may be performed by another computer, computer system, or server, for instance, similar to apparatuses 10 or 20 illustrated in FIG. 4(a) or 4(b).

According to certain embodiments, the method may be for maintaining a waiting list. In particular, the method may include, at 300, receiving data for an applicant to be placed on the waiting list with one or more requirements. The method may also include, at 305, creating a user profile associated with the waiting list based on the received data.

The method may further include, at 310, determining an applicant ranking on the waiting list based on a match between the user profile and the one or more requirements. In addition, the method may include, at 315, monitoring at least one of a need or a desire of the applicant based on periodic activity of the applicant on the waiting list. Further, the method may include, at 320, monitoring periodic changes to the one or more requirements. The method may also include, at 325, processing the at least one of the need, the desire, or the activity of the applicant, and the periodic changes to the one or more requirements using a machine learning model. At 330, the method may include dynamically updating, using the machine learning model, the applicant ranking on the waiting list according to a result of the processing.

Figure 4A:
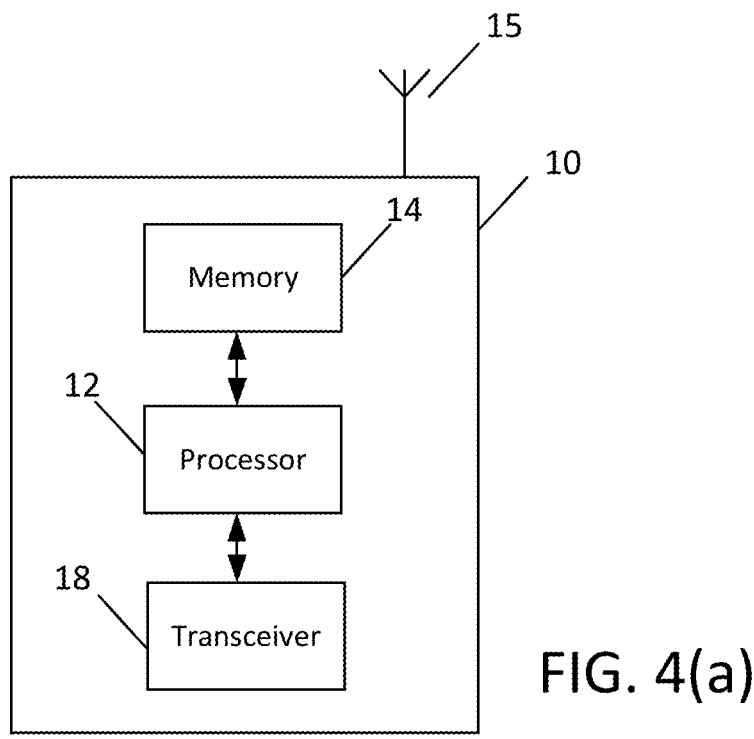
FIG. 4(a) illustrates an apparatus, according to certain example embodiments.
Figure 4B:
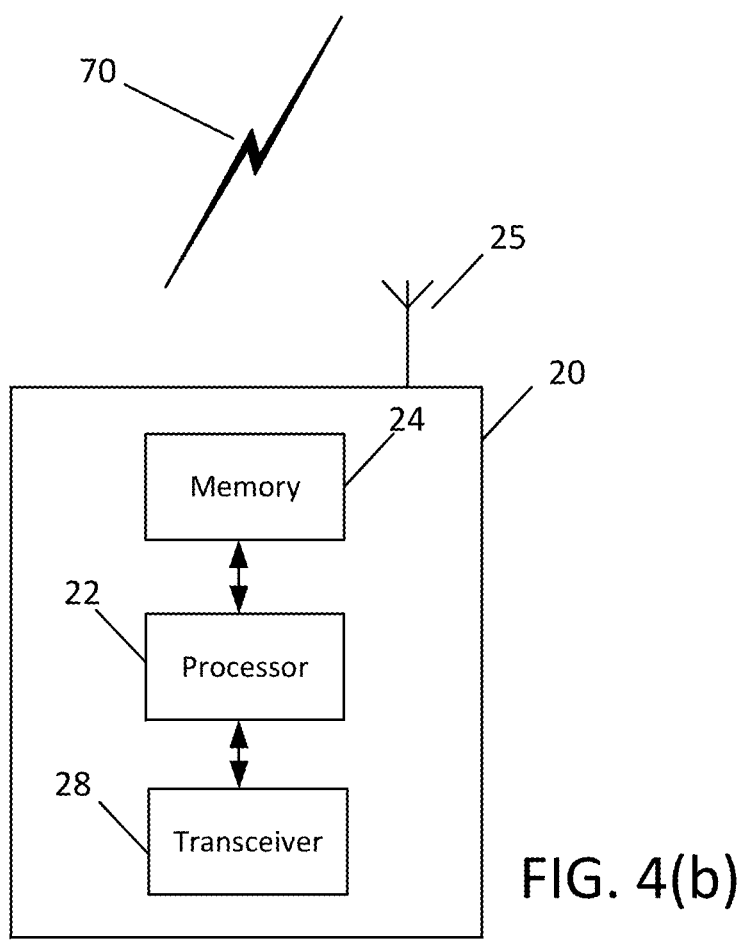
FIG. 4(b) illustrates another apparatus, according to certain example embodiments.

FIG. 4(a) illustrates an apparatus 10, according to certain example embodiments, and FIG. 4(b) illustrates an apparatus 20, according to certain embodiments. In certain embodiments, apparatuses 10, 20 may be a computer, computer system, server, mobile computing device, or other similar device.

In some example embodiments, apparatuses 10, 20 may include one or more processors, one or more computer-readable storage mediums (for example, memory, storage, or the like), one or more radio access components (for example, a modem, a transceiver, or the like), and/or a user interfaces. It should be noted that one of ordinary skill in the art would understand that apparatuses 10, 20 may include components or features not shown in FIGS. 4(a) and 4(b).

As illustrated in the example of FIGS. 4(a) and 4(b), apparatuses 10, 20 may include or be coupled to processors 12, 22 for processing information and executing instructions or operations. Processors 12, 22 may be any type of general or specific purpose processor. In fact, processors 12, 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12, 22 is shown in FIGS. 4(a) and 4(b), multiple processors may be utilized according to other example embodiments. For example, it should be understood that, in certain example embodiments, apparatuses 10, 20 may include two or more processors that may form a multiprocessor system (e.g., in this case processors 12, 22 may represent a multiprocessor) that may support multiprocessing. According to certain example embodiments, the multiprocessor system may be tightly coupled or loosely coupled (e.g., to form a computer cluster).

Processors 12, 22 may perform functions associated with the operation of apparatuses 10, 20 including, as some examples, precoding of antenna gain/phase parameters, encoding and decoding of individual bits forming a communication message, formatting of information, and overall control of the apparatuses 10, 20, including processes illustrated in FIGS. 1-3.

Apparatuses 10, 20 may further include or be coupled to a memory 14, 24 (internal or external), which may be coupled to processor 12, 22, for storing information and instructions that may be executed by processor 12, 22. Memory 14, 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14, 24 can be comprised of any combination of random access memory (RANI), read only memory (ROM), static storage such as a magnetic or optical disk, hard disk drive (HDD), or any other type of non-transitory machine or computer readable media. The instructions stored in memory 14, 24 may include program instructions or computer program code that, when executed by processor 12, 22, enable the apparatus 10, 20 to perform tasks as described herein.

In certain example embodiments, apparatus 10, 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12, 22 and/or apparatus 10, 20 to perform any of the methods illustrated in FIGS. 1-3.

In some example embodiments, apparatus 10, 20 may also include or be coupled to one or more antennas 15, 25 for receiving a downlink signal and for transmitting via an uplink from apparatus 10, 20. Apparatus 10, 20 may further include a transceiver 18, 28 configured to transmit and receive information. In certain example embodiments, apparatus 10, 20 may further include a user interface, such as a graphical user interface or touchscreen.

In certain example embodiments, memory 14, 24 stores software modules that provide functionality when executed by processor 12, 22. The modules may include, for example, an operating system that provides operating system functionality for apparatus 10, 20. The memory may also store one or more functional modules, such as an application or program, to provide additional functionality for apparatus 10, 20. The components of apparatus 10, 20 may be implemented in hardware, or as any suitable combination of hardware and software. According to certain example embodiments, apparatus 10 may optionally be configured to communicate with apparatus 20 via a wireless or wired communications link 70.

As discussed above, according to certain example embodiments, apparatus 10 may be a computer or computer system for example. According to certain embodiments, apparatus 10 may be controlled by memory 14 and processor 12 to receive data from the plurality of databases for an applicant to be placed on the waiting list with one or more requirements. Apparatus 10 may also be controlled by memory 14 and processor 12 to create a user profile associated with the waiting list based on the received data. Apparatus 10 may further be controlled by memory 14 and processor 12 to receive updates to the user profile from the applicant. In addition, apparatus 10 may be controlled by memory 14 and processor 12 to determine an applicant ranking on the waiting list based on a match between the user profile and the one or more requirements. Apparatus 10 may also be controlled by memory 14 and processor 12 to monitor at least one of a need or a desire of the applicant based on periodic activity of the applicant on the waiting list. Apparatus 10 may further be controlled by memory 14 and processor 12 to monitor periodic changes to the one or more requirements. Further, apparatus 10 may be controlled by memory 14 and processor 12 to update the applicant ranking on the waiting list based on the monitored at least one of the need, the desire, or the activity of the applicant and the changes to the one or more requirements. In addition, apparatus 10 may be controlled by memory 14 and processor 12 to synchronize the updated waiting list with the plurality of databases.

According to other embodiments, apparatus 10 may be controlled by memory 14 and processor 12 to receive data for an applicant to be placed on the waiting list with one or more requirements. Apparatus 10 may also be controlled by memory 14 and processor 12 to create a user profile associated with the waiting list based on the received data. Apparatus 10 may further be controlled by memory 14 and processor 12 to determine an applicant ranking on the waiting list based on a match between the user profile and the one or more requirements. In addition, apparatus 10 may be controlled by memory 14 and processor 12 to monitor at least one of a need or a desire of the applicant based on periodic activity of the applicant on the waiting list. Further, apparatus 10 may be controlled by memory 14 and processor 12 to monitor periodic changes to the one or more requirements. Apparatus 10 may also be controlled by memory 14 and processor 12 to update the applicant ranking on the waiting list based on the monitored at least one of the need, the desire, or the activity of the applicant and the changes to the one or more requirements.

In certain embodiments, apparatus 10 may be controlled by memory 14 and processor 12 to receive data for an applicant to be placed on the waiting list with one or more requirements. Apparatus 10 may also be controlled by memory 14 and processor 12 to create a user profile associated with the waiting list based on the received data. Apparatus 10 may further be controlled by memory 14 and processor 12 to determine an applicant ranking on the waiting list based on a match between the user profile and the one or more requirements. In addition, apparatus 10 may be controlled by memory 14 and processor 12 to monitor at least one of a need or a desire of the applicant based on periodic activity of the applicant on the waiting list. Further, apparatus 10 may be controlled by memory 14 and processor 12 to monitor periodic changes to the one or more requirements. Apparatus 10 may also be controlled by memory 14 and processor 12 to process the at least one of the need, the desire, or the activity of the applicant, and the periodic changes to the one or more requirements using a machine learning model. Apparatus 10 may further be controlled by memory 14 and processor 12 to dynamically update, using the machine learning model, the applicant ranking on the waiting list according to a result of the processing.

Certain example embodiments described herein provide several technical improvements, enhancements, and/or advantages. In some embodiments, it may be possible to streamline the waiting list process, and eliminate the need for multiple applications. Certain embodiments may also provide a universal application system means that with a single application, a rent-burdened individual or family may apply to multiple affordable housing programs—from Section 8 housing and disaster relief programs, to veterans assistance programs, tax credit programs, and more—and automatically be placed on all appropriate waiting lists. Certain embodiments may also eliminate the need for multiple applications, and provide time saving procedures for searching for programs to match the unique situations and demographics of certain applicants.

Other embodiments may keep waiting lists open to thereby provide effective management. For example, by using certain embodiments, it may be possible to send less mail and reduce response times. It may also be possible to provide 24/7 access to real-time address, phone and email verification. It may further be possible to provide live toll-free support lines, SMS/text and email alerts, reduce marketing costs and amount of mail sent by PHAs, update contact information, reduce applicants from being removed from waiting lists for no response, eliminate unnecessary application processing costs, and enable staff to devote time to other important program activities.

According to further embodiments, it may be possible to reduce the time burden on families and administrative burden for PHAs. Certain embodiments may also improve administrative efficiency, allow applicants to submit applications to more PHAs with one application, give individual PHAs a broader application pool, free up staff time to perform other functions, increase housing opportunities for families, and help improve vacancy/occupancy rates. Other embodiments may reduce the burden on applicants, and allow PHAs who prefer a regional approach to assisted housing to work together on their admittance policies. Further embodiments may enable PHAs to create a centralized application center for a PHA's public housing and housing choice voucher programs, and provide mobile-friendly access for applicants to the waiting lists and databases.

EXAMPLES

Figure 11:
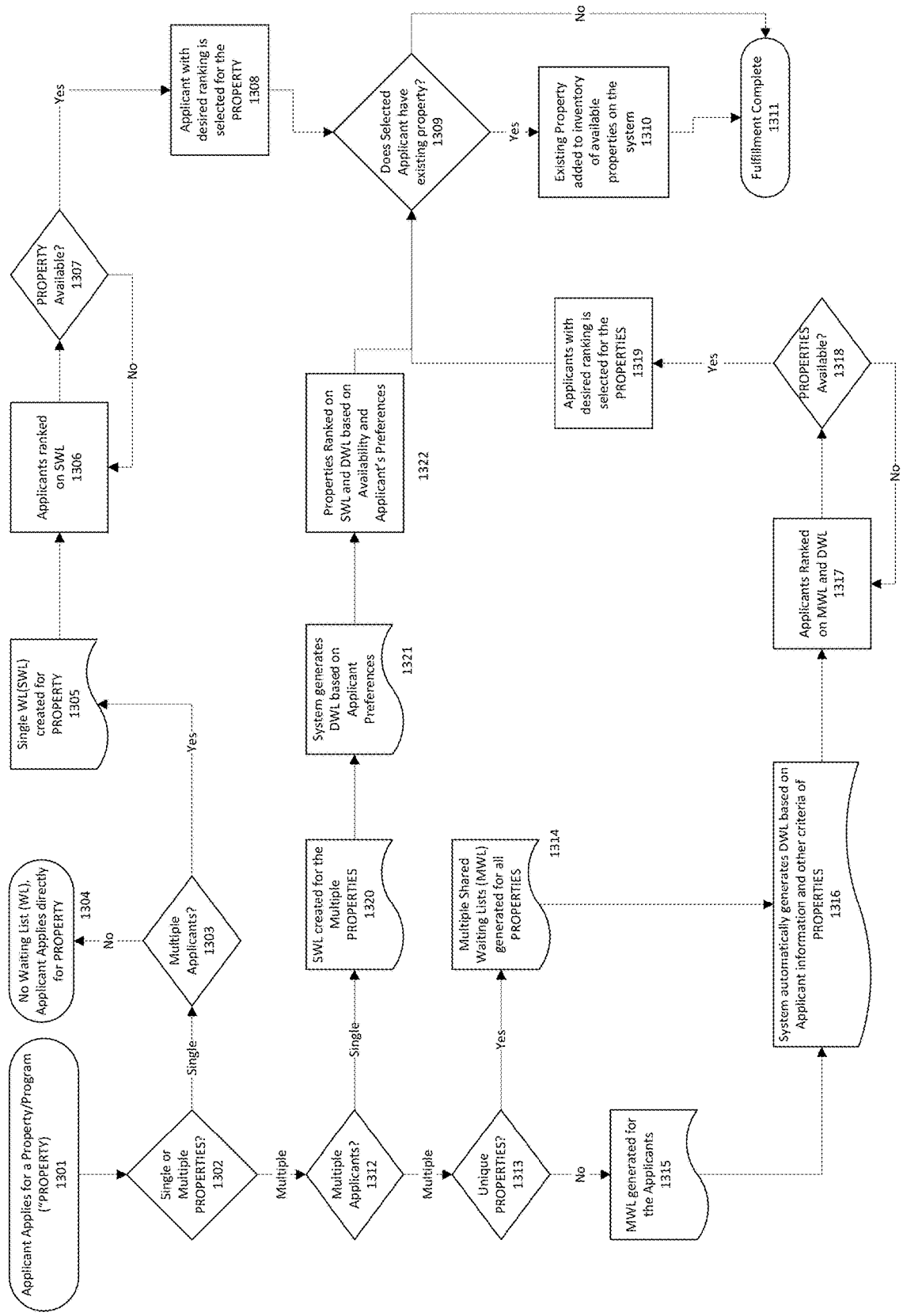
FIG. 11 illustrates a flow diagram of a further method to minimize property or program vacancy, according to certain example embodiments.

The following examples describe operation of certain embodiments of the waiting lists in various illustrative scenarios. These examples are described with reference to FIG. 11, which depicts a flow diagram for minimizing property vacancy according to certain embodiments. In these examples, information about the prospective applicant (e.g., personal information, eligibility information) has already been input into and stored in the waiting list solution and a corresponding user profile has been generated for the applicant based on this information. In some embodiments, the user profile may be associated with a unique applicant identifier (UAI) from the waiting list solution. All PHAs involved in these examples have also had information about the property and/or program input into the waiting list solution, which generates as a corresponding Property/Program user profile for that property and/or program. The waiting list solution also associates a unique Property/Program Identifier (UPI) for each Property/Program user profile stored in the waiting list solution.

Example 1: Direct Application

In this example, the applicant seeks to apply for a single property or housing program using the waiting list solution. In some embodiments, the waiting list solution may generate an application (e.g., application "A1BP1") for an applicant for a given property/program using the applicant's user profile (e.g., represented by UAI "A1") and the property/program's Property/Program user profile (e.g., represented by UPI "P1"). If the waiting list solution determines that the applicant's application is the only application submitted for this property/program (decision 1303), then the waiting list solution submits the application (e.g., Application A1P1) directly to the property/program (Property/Program P1) for consideration.

Example 2: Single Waiting List

In this example, multiple applicants (e.g., five applicants) submit applications for the same property/program (e.g., one property) and do not submit applications to any other properties/programs. In this example, the applicants and their corresponding applications may be represented by their respective UAI as follows: A1/A1P1; A2/A2P1; A3/A3P1; A4/A4P1; and A5/A5/P1. After determining that all applicants (e.g., A1, A2, A3, A4, A5) have all submitted applications for a single property of program (e.g., P1) (see decisions 1302, 1303), then the waiting list solution may create a ranked waiting list for the property/program (P1) for these applicants (A1, A2, A3, A4, A5) (see operation 1305 and decision 1306). In some embodiments, the waiting list solution may use one or more dynamic criteria to rank these applicants on the waiting list. For example, in this exemplary scenario, the applicants may be ranked from first to fifth and assigned a corresponding ranking (e.g., R1, R2, R3, R4, R5) in the created waiting list so that each applicant (or application) may be represented by the waiting list solution for this property/program in this example as A1P1R5, A2P1R3, A3P1R1, A4P1R2, and A5P1R4, where applicant A3 has the highest ranking (R1) for the given property/program (P1) and applicant A1 has the lowest ranking (R5). After creation of the waiting list, the waiting list solution may monitor the availability of the property/program by, for example, periodically checking to see if the property/program is open or now available for accepting an applicant (see decision 1307). If the program/program as determined by waiting list solution is available for receiving an applicant, the waiting list solution may use the ranked waiting list to identify and select the highest ranked applicant and submit (see operation 1309) this applicant's application for the property/program (e.g., applicant A3, who has the highest ranking R1 for this property/program P1). As part of this identification and selection process, the waiting list solution may check to determine whether the highest ranked applicant has already been accepted to another property/program (i.e., whether this applicant is still "available"), and if not, the waiting list solution may proceed to the next highest ranked application (e.g., applicant A4 having a ranking of R2 for property/program P1 in this example.)

Example 3: Shared Waiting List

In this example, five applicants (e.g., A1, A2, A3, A4, A5) are on three shared waiting lists in the waiting list solution for three unique properties or programs (e.g., P1, P2, P3). In this example, the applicants are assigned different rankings (e.g., R1, R2, R3, R4, R5) for each waiting list because the eligibility criteria may be specific for each property/program, and thus, the eligibility criteria for the properties/programs may vary from one another. This example begins with each applicant (e.g., five applicants A1, A2, A3, A4, A5) submitting information to the waiting list solution in the same manner as in the other examples (see operation 1301) but for applying for multiple properties/programs (e.g., P1, P2, P3). If the waiting list solution determines that the applicant is applying for multiple properties (see decision 1302), the waiting list solution then generates a waiting list for each property/program (see, e.g., operations 1315, 1314, 1316). As an option, if the waiting list solution determines that two or more of the properties/programs (e.g., P1, P2, P3) are associated with one another in some fashion (i.e., these properties/programs are not unique or different) (see decision 1313), the associated properties/programs (e.g., P1, P2, P3) may be combined by the waiting list solution and treated as a single or shared waiting list. As additional applicants apply for these properties/programs (see e.g., operation 1315), the waiting list solution may add them to the appropriate waiting list.

Further, the waiting list solution determines the appropriate ranking for each applicant for each property/program (e.g., P1, P2, P3) based on the information the waiting list solution has received and criteria associated with each property (see operations 1316 and 1317). In this example, the waiting list solution will have generated three waiting lists for properties/programs, P1, P2 and P3, with each waiting list having rankings for the five applicants A1, A2, A3, A4, A5. An illustrative ranking (R1-R5) for these waiting lists may be as follows:

Ranked waiting list for PI: A1 (R5), A2(R4), A3(R3), A4(R2), A5 (R1)

Ranked waiting list of P2: A1 (R3), A2(R1), A3(R5), A4(R2), A5 (R4)

Ranked waiting list for P3: A1 (R4), A2(R5), A3(R1), A4(R2), A5 (R3)

As discussed in the earlier examples, the waiting list solution may maintain these rankings using a UPI such as for example:

Ranked waiting list for PI: A1/P1(R5), A2/P1(R4), A3/P1 (R3), A4/P1(R2), A5/P1(R1)

Ranked waiting list of P2: A1/P2(R3), A2/P2(R1), A3/P2 (R5), A4/P2(R2), A5/P2(R4)

Ranked waiting list for P3: A1/P3(R4), A2/P3(R5), A3/P3 (R1), A4/P3 (R2), A5/P3 (R3)

In either notation system, applicant A5 has the highest ranking (R1) for the waiting list for property/program P1, applicant A2 has the highest ranking (R1) for the waiting list for property/program P2, and applicant A3 has the highest ranking (R1) for the waiting list for property/program P3. The waiting list solution may maintain the rankings in the waiting lists dynamically so that the rankings can be adjusted/updated as additional applicants are added (or removed) from a waiting list or so that if an added applicant meets the criteria more closely, the ranking can be adjusted to given this applicant a higher ranking and reduce the rankings of the existing applicants in the list, accordingly. Similarly, the rankings can be dynamically updated/adjusted if an applicant is withdrawn from the waiting list so that the remaining applicants with lower rankings than the withdrawn applicant can be adjusted to a higher ranking accordingly (see operations 1314, 1316, 1317). As discussed in the previous examples, applicants can be selected from the appropriate waiting lists and their existing residences may be added to the inventory of available properties (see operations 1318, 1319, 1309, 1310).

Example 4: Shared Waiting List Chain

In one embodiment, the waiting list solution may also "chain" the waiting lists so that as one applicant is selected for one property/program, the other waiting lists where that applicant is registered are updated by the waiting list solution to remove that applicant from those other waiting lists and update the rankings the other remaining applicants on those waiting lists and to include the selected applicants existing residence(s) (that are now—or will soon be— vacated) (see e.g., decision 1309 and operation 1310). To illustrate this example, there are five applicants (A1, A2, A3, A4, A5) on the three waiting lists for properties/programs P1, P2, P3 (as in the previous example). Two of these applicants have properties/residences that will become available when they are fulfilled (e.g., A1 has existing property P5 and A2 has existing property P3). As discussed before, an applicant with an existing property creates an opportunity for fulfillment on another waiting list by creating a vacancy/opportunity when that applicant is fulfilled. The waiting list solution may keep track of this information in the waiting lists as represented below:

waiting list for P1: A1/P5(R5), A2/P3(R4), A3(R3), A4(R2), A5(R1)

waiting list for P2: A1/P5(R3), A2/P3(R1), A3(R5), A4(R2), A5(R4)

waiting list for P3: A1/P5(R4), A6(R5), A3(R1), A4(R2), A5(R3)

As can be seen in the above representation, the waiting list solution can include in the waiting list information about existing residences of applicants, which can be added to the inventory of available properties as the applicant is selected from any of the waiting lists for a new property. In this representation the waiting lists indicate that A1 has existing residence/property P5 and applicant A2 has existing residence/property P3. Note that an additional applicant A6 has been added to the waiting list for property P3 and has the lowest ranking in that waiting list of (R5). If, for example, applicant A2 (who has the highest rank (R1) in the waiting list is selected for property P2, applicant A2's selection creates movement in the waiting list for P3 because P3 which was the current/former residence of applicant A2 will now become (or is becoming) available. The selection of applicant A2 will then make applicant A3 eligible for property P3 in with waiting list because applicant A3 has the highest ranking (R1) on the waiting list for P3. As this example illustrates, a shared waiting list chain may increase the number of applicants that are fulfilled using the waiting list solution to add existing residences to the available inventory (see decision 1309 and operation 1310).

Example 5: Shared Waiting List Chains with AI Property Matching

Example 5 is similar to the scenario described in Example 4 with the addition of Artificial Intelligence (AI) to the waiting list solution. AI may be used by the waiting list solution to automatically match applicants to similar properties/programs with similar eligibility requirements to those for which the applicant previously applied or programs/properties where the AI's analytics suggest may be a good match the applicant's profile data. Adding this AI functionality/feature to the waiting list solution may help to increase the chances of an applicant being fulfilled by further increasing the number of waiting lists that the given applicant is a member of (i.e., on the waiting list (s)).

In this illustrative example, applicant A1 has applied to three waiting lists for properties P1, P2, P3 as the previous examples (and in a similar manner). In this example, the waiting list solution uses AI to automatically add applicant A1 to three additional waiting list s for properties/programs that the AI has determined are similar to the original three properties (e.g. P1, P2, P3) based on matching the criteria from the three original properties/programs to other properties that the AI indicates have similar or the same criteria. As a result, the waiting list solution applies/associates applicant A1 to six waiting lists: the original three for properties/programs and to three additional waiting list s for three properties/programs P1a, P2a, P2b that the waiting list solution's AI identified as set forth in the illustrative waiting lists below:

Original waiting list for P1: A1/P3(R5), A2/P3(R4), A3(R3), A4(R2), A5(R1)

AI Recommended waiting list for P1a: A1/P3(R3), A2(R4), A3(R5), A4(R2), A5(R1)

Original waiting list for P2: A1/P3(R3), A2/P3(R1), A3(R5), A4(R2), A5(R4)

AI Recommended waiting list for P2a: A1/P3(R2), A2(R1), A3(R5), A4(R3), A5(R4)

AI Recommended waiting list for P2b: A1/P3(R1), A2(R5), A3(R4), A4(R2), A5(R3)

Original List 3: A1/P3(R4), A6(R5), A2(R1), A4(R2), A5(R3)»P3

In some embodiments, if the selected applicant (e.g., A3 in this example) is placed in the given property/program, the waiting list solution may also check (see decision 1309) to determine whether the selected applicant has an existing residence that the applicant will be or has been vacated after being placed in the property/program P1. If the selected applicant is determined by the waiting list solution to have such an existing residence, then the waiting list solution may undertake operations to add the applicant's existing (or previous) residence to an inventory of available properties maintained by the waiting list solution (see operation 1310).

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

I claim:

1. A method for using artificial intelligence for automatically matching an applicant to one or more electronic waiting list solutions compatible with a plurality of databases, comprising:

receiving data for an applicant to be placed on the one or more electronic waiting lists with one or more requirements;

creating a user profile associated with the one or more electronic waiting lists based on the received data;

receiving updates to the user profile from the applicant;

determining, using the artificial intelligence, a first applicant ranking on the one or more electronic waiting lists based on a match between the user profile and the one or more requirements;

monitoring at least one of a need or a desire of the applicant based on periodic activity of the applicant on the one or more electronic waiting lists;

monitoring periodic changes to the one or more requirements;

applying the monitored at least one of a need or a desire of the applicant, the activity of the applicant on the one or more electronic waiting lists, the monitored periodic changes, and the first applicant ranking as input in the artificial intelligence to generate a second applicant ranking;

updating, using the artificial intelligence, the second applicant ranking on the one or more electronic waiting lists;

automatically applying, using the artificial intelligence, the applicant to a first opportunity based on the second applicant ranking when the first opportunity is available; and automatically matching, using the artificial intelligence, the applicant to a second opportunity that is similar to the first opportunity and that comprises similar requirements as the one or more requirements, wherein the matching is performed based on artificial intelligence analytics learned from the at least one of the need, the desire, or the activity of the applicant.

2. The method according to claim 1, further comprising dynamically changing a status of the applicant on the one or more electronic waiting lists based on unforeseen circumstances.

3. The method according to claim 1, wherein the one or more electronic waiting lists comprises sub-lists, sub-categories, and sub-preferences that are configured to open and close.

4. The method according to claim 1, further comprising synchronously updating and maintaining the user profile for all of the plurality of databases based on changes made to the user profile by the applicant.

5. The method according to claim 1, wherein the user profile is applicable to a plurality of waiting lists.

6. The method according to claim 1,
wherein the received data comprises applicant data, and
wherein the method further comprises continuously validated in real-time the applicant data based on changes to at least one of the applicant's need, desire, or activity.

7. The method according to claim 1, further comprising automatically applying the applicant to an opportunity when the opportunity is available.

8. The method according to claim 1, further comprising sorting the one or more electronic waiting lists according to an activity of the applicant.

9. The method according to claim 1, wherein the one or more electronic waiting lists is related to a real estate rental property or other real estate transaction.

10. The method according to claim 9, further comprising receiving one or more offers from third party vendors for performing services to the real estate rental property or the other real estate transaction based on a change in status of the real estate rental property or the other real estate transaction.

11. The method according to claim 1, wherein the data is received from the plurality of databases.

12. The method according to claim 1, further comprising synchronizing the updated one or more electronic waiting lists with the plurality of databases.

13. The method according to claim 1, wherein the input in the artificial intelligence comprises additional application data provided by the applicant.

14. A method for using artificial intelligence for maintaining one or more electronic waiting lists, comprising:

receiving data for an applicant to be placed on the one or more electronic waiting lists with one or more requirements;

creating a user profile associated with the one or more electronic waiting lists based on the received data;

determining, using the artificial intelligence, a first applicant ranking on the one or more electronic waiting lists based on a match between the user profile and the one or more requirements;

monitoring at least one of a need or a desire of the applicant based on periodic activity of the applicant on the one or more electronic waiting lists;

monitoring periodic changes to the one or more requirements;

applying the monitored at least one of a need or a desire of the applicant, the activity of the applicant on the one or more electronic waiting lists, the monitored periodic changes, and the first applicant ranking as input in the artificial intelligence to generate a second applicant ranking;

processing the at least one of a need, a desire, or the activity of the applicant, and the periodic changes to the one or more requirements using artificial intelligence;

dynamically updating, using the artificial intelligence, the second applicant ranking on the one or more electronic waiting lists according to a result of the processing;

automatically applying, using the artificial intelligence, the applicant to a first opportunity based on the second applicant ranking when the first opportunity is available; and automatically matching, using the artificial intelligence, the applicant to a second opportunity that is similar to the first opportunity and that comprises similar requirements as the one or more requirements, wherein the matching is performed based on artificial intelligence analytics learned from the at least one of the need, the desire, or the activity of the applicant.

15. An apparatus implementing artificial intelligence for automatically matching an applicant to one or more electronic waiting list solutions compatible with a plurality of databases, comprising:

at least one processor; and
at least one memory comprising computer program code,
wherein the at least one memory and the computer program code is configured to, with the at least one processor, cause the apparatus at least to:

receive data from the plurality of databases for an applicant to be placed on the one or more electronic waiting lists with one or more requirements;

create a user profile associated with the one or more electronic waiting lists based on the received data;

receive updates to the user profile from the applicant;

determine, using the artificial intelligence, a first applicant ranking on the one or more electronic waiting lists based on a match between the user profile and the one or more requirements;

monitor at least one of a need or a desire of the applicant based on periodic activity of the applicant on the one or more electronic waiting lists;

monitor periodic changes to the one or more requirements;

applying the monitored at least one of a need or a desire of the applicant, the activity of the applicant on the one or more electronic waiting lists, the monitored periodic changes, and the first applicant ranking as input in the artificial intelligence to generate a second applicant ranking;

update, using the artificial intelligence, the second applicant ranking on the one or more electronic waiting lists
synchronize the updated one or more electronic waiting lists with the plurality of databases;
automatically apply, using the artificial intelligence, the applicant to a first opportunity based on the second applicant ranking when the first opportunity is available; and
automatically match, using the artificial intelligence, the applicant to a second opportunity that is similar to the first opportunity and that comprises similar requirements as the one or more requirements,
wherein the match is performed based on artificial intelligence analytics learned from the at least one of the need, the desire, or the activity of the applicant.

* * * * *